United States Patent [19]

Foerster

[11] 4,364,852
[45] Dec. 21, 1982

[54] POLYOLEFIN CATALYSTS CONTAINING HETEROCYCLIC CARBOXYLIC ACID ESTERS

[75] Inventor: Rolf F. Foerster, Morris, Ill.

[73] Assignee: Northern Petrochemical Company, Omaha, Nebr.

[21] Appl. No.: 270,258

[22] Filed: Jun. 4, 1981

[51] Int. Cl.$^3$ .............................................. C08F 4/64
[52] U.S. Cl. ................................. 252/429 B; 526/140; 526/141; 526/142
[58] Field of Search ..................................... 252/429 B

[56] References Cited

U.S. PATENT DOCUMENTS 3,663,450  5/1972  Cozewith et al. ................ 252/429 B
3,919,180  11/1975  Furukawa et al. .......... 252/429 B X
4,015,060  3/1977  Karayannis et al. ......... 252/429 B X
4,255,280  3/1981  Sakurai et al. ................... 252/429 B Primary Examiner—Patrick Garvin
Attorney, Agent, or Firm—Donald F. Haas

[57] ABSTRACT

A catalyst system for the preparation of homopolymers and copolymers of alpha monoolefins comprising (1) a titanium halide of the formula

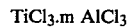

TiCl$_3$.m AlCl$_3$ where m is a number from 0 to 0.5, (2) an ester of a carboxylic acid having an oxygen, nitrogen, or sulfur-containing heterocyclic structure, and (3) an appropriate conventional aluminum alkyl.

3 Claims, No Drawings

POLYOLEFIN CATALYSTS CONTAINING HETEROCYCLIC CARBOXYLIC ACID ESTERS

BACKGROUND OF THE INVENTION

The present invention relates to a process for the preparation of homopolymers and copolymers of alpha monoolefins at from 20° to 160° C., especially from 50° to 120° C., and under a pressure of from 1 to 100, especially from 20 to 70, bar, by means of a catalyst system comprising (1) a titanium halide of the formula $$TiCl_3 \cdot m\ AlCl_3$$

where m is a number from 0 to 0.5, especially from 0.1 to 0.4, and (2) an aluminum-alkyl of the formula $$\begin{array}{c} X-Al-Y \\ | \\ Z \end{array}$$

where X and Y are each alkyl of not more than 8, especially not more than 2, carbon atoms, and Z is chlorine or alkyl of not more than 8, especially not more than 2, carbon atoms.

Specific modifications of the catalyst system may be made in order to achieve particular objectives, for example the following:

(a) Catalyst systems which can be incorporated into the polymerization reactor in situ and do not require expensive and time-consuming grinding processes as disclosed in U.S. Pat. Nos. 4,120,823, 4,154,699, and 4,154,700, issued Oct. 17, 1978 and May 15, 1979, respectively.

(b) Catalyst systems which on polymerization of alpha monoolefins, especially propylene, give polymers with a relatively high proportion of stereoregular (=isotactic) polymer.

(c) Catalyst systems which can give an increased yield of polymer, namely systems of increased productivity (systems where the amount of polymer formed per unit weight of catalyst system is increased).

(d) Catalyst systems which introduce less halogen into the polymer, which is achievable by increasing the yield according to (c) and/or by employing a titanium halide which contains very little halogen.

(e) Catalyst systems which retain a constant or relatively constant activity maximum over a very long time, which is of substantial importance for the catalyst yield.

(f) Catalyst systems which make it possible, by increasing the polymerization temperature, to increase the conversion without a significant reduction in the stereoregularity of the polymers, an effect which is generally desirable, especially in dry phase polymerization.

(g) Catalyst systems by means of which—especially at relatively high polymerization temperatures—the morphological properties of the polymers can be influenced in a particular way, for example, in giving a uniform particle size and/or reducing the proportion of fines and/or giving a high bulk density. These factors may, for example, be significant in respect of technical control of the polymerization system, of working of the polymers, and/or processability of the polymers.

(h) Catalyst systems which are simple and safe to prepare and easy to handle; for example, systems which can be prepared in (inert) hydrocarbon auxiliary media.

(i) Catalyst systems which make it possible, where the polymerization is carried out in the presence of a molecular weight regulator, especially hydrogen, to manage with relatively small amounts of regulator. This can be significant, for example, in respect to the thermodynamics of the process.

(j) Catalyst systems which are tailored for specific polymerization processes, for example, catalysts which are suited either to the specific peculiarities of suspension polymerization or to the specific peculiarities of dry phase polymerization.

(k) Catalyst systems which give polymers having a pattern of properties which makes them particularly suitable for one or another field of use.

Experience to date has shown that amongst the various objectives there are some which can only be achieved by special embodiments of the catalyst system if other objectives are lowered. Under these circumstances it is, in general, desirable to find embodiments which not only achieve the particular objectives but also demand minimum lowering of other desirable objectives.

It is an object of the present invention to provide a novel embodiment of a catalyst system by means of which better results can be achieved—for similar objectives—than with conventional embodiments. We have found that this object is achieved with a catalyst system of the type defined at the outset, which contains, as a further component (3), a Lewis base having at least two pairs of electrons to donate, particularly esters of carboxylic acids having oxygen, nitrogen, or sulfur-containing heterocyclic structures.

U.S. Pat. No. 4,255,280 issued Mar. 10, 1981, discloses catalysts for polymerization of olefins which comprise a solid catalyst component, which is a support material, an organometallic compound, and a heterocyclic carboxylic acid ester which contains nitrogen, oxygen, or sulfur. The catalysts disclosed in that patent require an organomagnesium compound and a catalyst support material, neither of which are present in nor required for the catalyst of the present invention. My catalyst can be prepared directly from commercially available titanium trichloride products. French Pat. No. 2,253,029 discloses that the addition of 2-pyrrolecarboxaldehyde or 1-methyl-2-pyrrolecarboxyaldehyde to standard polyolefin catalysts increases the isotacticity of the stereospecific polymers produced. These compounds both have more than one pair of electrons to donate, but neither of them is a carboxylic acid ester.

SUMMARY OF THE INVENTION

Accordingly, the present invention relates to a process for the preparation of homopolymers and copolymers of alpha monoolefins at from 20° to 160° C., especially from 50° to 120° C., under pressures of from 1 to 100 bar, especially from 20 to 70 bar, by means of a catalyst system comprising (1) a titanium halide of the formula $$TiCl_3 \cdot m\ AlCl_3$$

where m is a number from 0 to 0.5, especially from 0.1 to 0.4, (2) an ester of a carboxylic acid having an oxygen, nitrogen, or sulfur-containing heterocyclic structure, and (3) an aluminum-alkyl of the formula

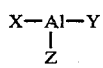

where X and Y are each alkyl of not more than 8, especially not more than 2, carbon atoms, and Z is chlorine or alkyl of not more than 8, especially not more than 2, carbon atoms, with the proviso that (I) the molar ratio of ester (2): titanium halide (1) is from about 0.005 to about 5, especially from about 0.05 to about 0.5, and (II) the molar ratio of titanium halide (1): aluminum-alkyl (3) is from 1:1 to 1:20, especially from 1:2 to 1:15.

DETAILED DESCRIPTION OF THE INVENTION

The polymerization process as such can—taking into account its characterizing feature—be carried out in virtually all relevant conventional technological embodiments, i.e. as a batchwise, cyclic or continuous process, which may, for example, be a suspension polymerization process, solution polymerization process, or gas phase polymerization process. The technological embodiments mentioned are well-known from the literature and from industrial practice and do not require more detailed comments.

For completeness, it should be mentioned that in the process according to the invention, the molecular weights of the polymers can be regulated by the relevant conventional measures, e.g. by means of regulators, especially hydrogen. Further, it is to be noted that in the process according to the invention, the components of the catalyst system can be introduced into the polymerization space in various ways, for example (i) by introducing the product obtained by milling the titanium halide (1) and the ester (2), as one component, and the aluminum-alkyl (3) as a further component, all at the same place, (ii) by introducing a simple mixture of (1) and (2), on the one hand, and the aluminum-alkyl (3), on the other, at the same or (iii) different places, or (iv), most preferably by introducing all three components at different places. This method is preferred because it facilitates mixing and avoids "hot spots" in the reactor. Finally, it is to be pointed out that the advantageous features of the process according to the invention in general manifest themselves particularly if the process is carried out as a dry phase polymerization (typical examples of such polymerization processes being given in German Published Applications DAS Nos. 1,217,071, 1,520,307 and 1,520,373).

One of the features of the process according to the invention is that the titanium halide (1) and the ester (2) do not have to be milled together before use. Milling methods, for example, those described in U.S. Pat. Nos. 4,120,823, 4,154,699, and 4,154,700, referred to above, are used to ensure that sufficient surface area exists for contact of the catalyst with the monomers. They are quite time-consuming and expensive. The catalyst of the present invention does not require milling in order to provide sufficient surface area because it may be prepared directly from commercially available titanium trichloride products having a suitable particle size distribution.

Regarding the materials used in the novel catalyst system, the following details should be noted:

The titanium halide (1) employed can be a titanium halide, for example, a reaction product obtained on reducing a titanium tetrahalide with hydrogen, aluminum or an aluminum-organic compound. Compounds which have proved very suitable are, for example, trichlorides of the formula $TiCl_3$, as obtained by reducing titanium tetrachloride with hydrogen, and especially co-crystals, as obtained by co-crystallizing $TiCl_3$ and $AlCl_3$ or reducing $TiCl_4$ with aluminum or with mixtures of aluminum and titanium. Co-crystals of the formula $TiCl_3.\frac{1}{3}AlCl_3$ are particularly suitable. The appropriate titanium halides (1) are commercially available and hence do not require further comment.

Suitable esters (2) are esters of carboxylic acids which have an oxygen, nitrogen, or sulfur-containing heterocyclic structure, such as those with the following formulae:

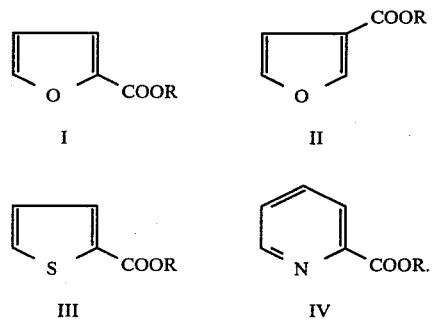

The acid group may be, for example, 2-furoic acid (2-furancarboxylic acid), 3-furoic acid, 2-thiophenecarboxylic acid, or picolinic acid (2-pyridinecarboxylic acid). Typical examples of very suitable esters (2) are ethyl furoate, ethyl-3-furoate, ethyl-2-thiophene carboxylate, and ethyl picolinate. The mole ratio of the ester to titanium trichloride may be varied over a wide range, for example, from about 0.005 to about 5. If the mole ratio is less than about 0.005, then there is no beneficial effect, and if it is greater than about 5, then the catalyst system is poisoned. The mole ratio is preferably in the range of about 0.05 to about 0.5 because best results are obtained with respect to catalyst productivity and stereospecificity. The processes of this invention may also be applied to supported olefin polymerization catalysts. In that case, the stoichimetric ratio above may be varied over an even wider range.

Suitable aluminum-alkyls (3) of the stated formula are again the relevant conventional compounds of this formula. These are so well known from the literature and from industrial practice that they do not require more detailed discussions here. Particularly important examples are triethyl-aluminum and diethyl-aluminum chloride.

The process according to the invention makes it possible to prepare homopolymers and copolymers of alpha monoolefins in an advantageous manner, particularly suitable polymerizable alpha monoolefins being ethylene, propylene, butene-1, and 4-methyl-pentene-1, and copolymers thereof with ethylene.

EXAMPLE 1

A stirred two-liter polymerization reactor was charged with 1300 ml of pure, dry, deoxygenated heptane. Sixty-three microliters of ethyl-3-furoate was added, followed by 1.048 grams of a solid catalyst consisting of titanium trichloride and aluminum chloride in the mole ratio of 3/1. The components were stirred together in a nitrogen atmosphere for one hour at room temperature. Then 13 ml of a 25.9% solution of diethylaluminum chloride (DEAC) in heptane was injected, and the temperature was raised to 60° C. Gaseous propylene was bubbled into the slurry at the rate of 50 liters per hour for 3 hours. Polymerization proceeded until terminated by addition of 100 ml of methanol. The polymer slurry was then precipitated into 5 liters of methanol containing 10 ml of concentrated hydrochloric acid. The polymer was isolated by filtration, washed with methanol, and dried in a vacuum oven at 80°–90° C.

The yield was 61.1 g, representing a catalyst productivity of 75.1 g per gram of $TiCl_3$. Upon extraction with boiling heptane, there remained an insoluble residue of 97.3%. A comparison experiment conducted in essentially the same manner but in the absence of ethyl-3-furoate produced only 40.7 g of polypropylene, or 57.2 g/g $TiCl_3$, with a heptane-insoluble fraction of only 96.2%.

EXAMPLE 2

Propylene was polymerized essentially as described in Example 1 but with a catalyst system prepared from 77 mg of ethyl-3-furoate, 1.1065 g of $TiCl_3 \cdot \frac{1}{3}AlCl_3$, and 14 ml of a 25.9% DEAC solution. The polymer yield was 58.3 g, or 67.9 g/g $TiCl_3$. Upon extraction, there remained a heptane-insoluble residue of 97.4%. A control experiment in the absence of ethyl furoate produced only 46.6 g of polymer, or 57.0 g/g $TiCl_3$, with a heptane-insoluble fraction of 96.0%.

EXAMPLE 3

Propylene was polymerized essentially as described in Example 1 but with a catalyst system prepared from 67 microliters of ethyl-2-thiophene carboxylate, 1,023 g of $TiCl_3 \cdot \frac{1}{3}AlCl_3$, and 12.8 ml of 25.9% DEAC solution. The polymer yield was 56.7 g, or 71.4 g/g $TiCl_3$. The heptane-insoluble fraction amounted to 96.4%.

EXAMPLE 4

Propylene was polymerized essentially as described in Example 1 but with a catalyst system prepared from 68 microliters of ethyl picolinate, 1.056 g of $TiCl_3 \cdot \frac{1}{3}AlCl_3$, and 13.4 ml of 25.9% DEAC solution. The polymer yield was 44.4 g, or 54.2 g/g $TiCl_3$. The heptane-insoluble fraction was 97.3%.

We claim:
1. A catalyst system for the preparation of homopolymers and copolymers of alpha monoolefins comprising
   (1) a titanium halide of the formula

$TiCl_3 \cdot m\ AlCl_3$ 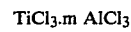

where M is a number from 0 to 0.5,
   (2) an ester of a carboxylic acid having an oxygen, nitrogen, or sulfur-containing heterocyclic structure, wherein the ester group is attached to a carbon atom in the heterocyclic structure, and
   (3) an aluminum-alkyl of the formula $$\begin{array}{c} X-Al-Y \\ | \\ Z \end{array}$$

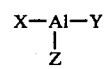

where X and Y are each alkyl of not more than 8 carbon atoms, and Z is chlorine or alkyl of not more than 8 carbon atoms, with the proviso that (I) the molar ratio of ester (2): titanium halide (1) is from about 0.005 to about 5, and (II) the molar ratio of titanium halide (1): aluminum-alkyl (3) is from 1:1 to 1:20.
2. The catalyst system of claim 1 wherein the ester is selected from the group consisting of ethyl furoate, ethyl-3-furoate, ethyl-2-thiophene carboxylate, and ethyl picolinate.
3. The catalyst system of claim 2 wherein the molar ratio of ester (2): titanium halide (1) is from about 0.05 to about 0.5.

* * * * *